(No Model.)
J. G. WHITLOCK.
FITTING FOR STEAM AND OTHER VALVES.
No. 342,853. Patented June 1, 1886.
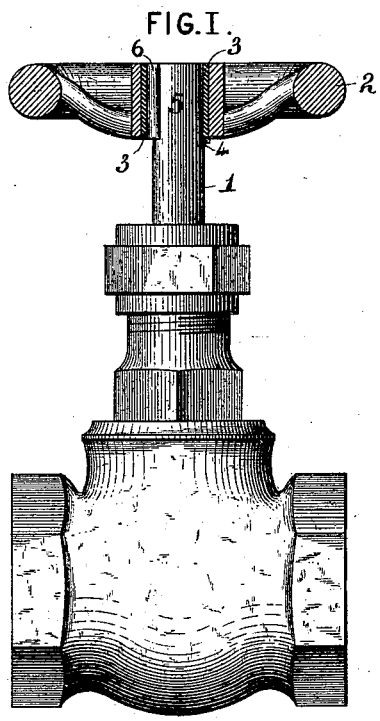
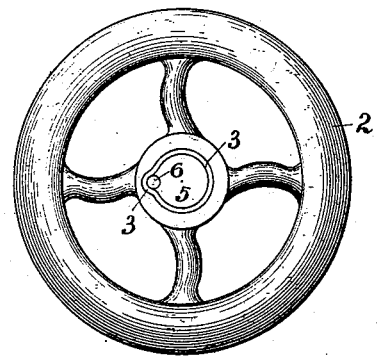
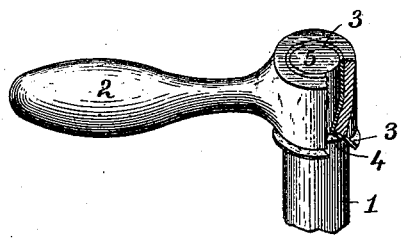
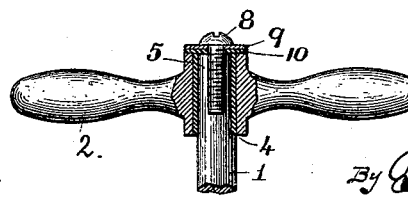
ATTEST—
J. Henry Kaiser.
Harry L. Amer.
INVENTOR—
James G. Whitlock
By Knight Bros.
Atty's

UNITED STATES PATENT OFFICE.

JAMES GILBERT WHITLOCK, OF RICHMOND, VIRGINIA.

FITTING FOR STEAM AND OTHER VALVES.

SPECIFICATION forming part of Letters Patent No. 342,853, dated June 1, 1886.

Application filed March 11, 1885. Serial No. 158,465. (No model.)

*To all whom it may concern:*

Be it known that I, JAMES GILBERT WHITLOCK, a citizen of the United States, residing at Richmond, in the county of Henrico and State of Virginia, have invented a new and useful Improvement in Fittings for Steam and other Valves, of which the following is a specification.

The object of my invention is to prevent the handles by which the valves of steam and hot water appliances are manipulated from becoming heated. To this end I interpose between the valve-stem and the handle, key, or wrench of any form by which the valve is manipulated a body of asbestus, so applied as to prevent contact between the metallic surfaces, and consequently to prevent the injurious or inconvenient conduction of heat.

The invention may be applied in various ways, according to the construction and purpose of the valve with which it is used. For the purpose of illustration I have shown it as applied to the stem of a globe-cock or other valve operated by customary hand-wheel or disk; also, as applied to valves or faucets of other common forms.

In the accompanying drawings, Figure I is a longitudinal section illustrating the device as applied to handle and stem of a globe-valve of common form. Fig. II is a plan of the same. Fig. III is a perspective view of the stem and key of a valve or cock of another common form, illustrating the invention. Fig. IV is a longitudinal section illustrating the invention as applied to a common hot-water faucet.

In these illustrations I have shown three common forms of connection between the key or handle and the valve-stem, which will suffice to illustrate the general applicability of the invention.

In each of the several figures 1 represents the stem of a valve or faucet, and 2 the handle, key, or cross-piece applied thereto for manipulating the same.

3 represents a body of asbestus interposed between the stem and handle, for the purpose of intercepting heat and preventing its conduction from one to the other.

The stem 1 is usually formed with a shoulder, 4, at the base of the tang 5, to which the key or handle 2 is applied. The tang 5 may be round, as in Figs. I and II, oblong, as in Fig. III, or square, as in Fig. IV, and may be secured to the tang or stem in any of the usual ways. With a round tang, as in Figs. I and II, it is customary to use a key, 6, either driven or screwed in, to prevent the handle turning on the stem. It will be apparent that in order to insure the complete effect of my invention, this key should not come in contact with both the metallic parts 5 and 2, so as to form a bridge for the conduction of heat between them. I therefore interpose the asbestus packing 3 between the key 6 and the handle 2, as illustrated in Figs. I and II, the effect being to force the asbestus packing into the key-seat in the handle; or else, if preferred, the asbestus packing is interposed between the key 6 and the tang 5, so as to be forced into the key-seat of the tang. For the same reason the asbestus packing 3 is extended over the shoulder 4, under the handle 2. In the case of the oblong tang shown in Fig. III, or with a tang of square or other non-circular shape, the key is of course unnecessary. In the case of the faucet shown in Fig. IV, the handle 2 is, as usual, prevented from turning on the tang 5 by making the said tang and the eye of the handle with corresponding or counterpart flat surfaces, and the handle is secured by a screw, 8, and metallic washer 9. In this case I interpose the non-conducting asbestus packing 3 between the tang 5 and the eye of the handle 2, and also between the base of the handle 2 and the shoulder 4. I also employ a non-conducting washer, 10, of asbestus, applied beneath the metallic washer 9, so as to completely cut off metallic contact. In all cases it is preferred to apply the asbestus packing 3 in several layers, so as to prevent danger of its being torn completely through at any part.

It will be understood that with metallic contact of even very small area, such as might be furnished by the key 6 or the screw 8, if said screw or key be in contact with both metallic surfaces, heat gradually passes to the handle and accumulates therein, so that after a considerable time it becomes too hot to manipulate with comfort; but by completely cutting off the communication and conduction of heat the heating of the handle to any considerable extent is effectually prevented.

It will be observed that when a key, 6, or like fastening is employed there should be some surplus of the non-conducting packing 3 in the key-seat, to prevent tearing, as asbestus is not a very yielding substance. For this reason I usually press the asbestus packing as nearly as possible into the form required before applying the handle 2 and key 6, so that the separation will remain intact.

I am aware that asbestus has been used in many ways to lessen the conduction of heat from a hot body of metal to its handle, and hence do not claim novelty in this, broadly considered. I have devised a novel construction under which this old principle is applied, resulting in the perfect and complete cutting off of metallic connection without impairing the mechanical connection of the parts.

Having thus described my invention, the following is what I claim as new therein, and desire to secure by Letters Patent:

1. The combination, with the valve-stem 1 and handle 2 of a steam or hot-water apparatus, of the asbestus packing 3, applied to the tang 5 of the stem and the handle 2, as herein shown and described, entirely separating them and preventing metallic contact.

2. The combination, with the valve-stem 1 and handle 2, of the non-conducting packing 3 of asbestus, wound around the tang 5 in a number of layers and extending over the shoulder 4, as and for the purposes specified.

JAMES GILBERT WHITLOCK.

Witnesses:
OCTAVIUS KNIGHT,
HARRY E. KNIGHT.